United States Patent
Yang et al.

(10) Patent No.: US 10,966,115 B2
(45) Date of Patent: Mar. 30, 2021

(54) RESOURCE MANAGEMENT FOR INTERWORKING BETWEEN LTE AND NEXT GENERATION MOBILE NETWORKS

(71) Applicant: Verizon Patent and Licensing Inc., Arlington, VA (US)

(72) Inventors: Jin Yang, Orinda, CA (US); Ahmed Moussa, Basking Ridge, NJ (US); Steven F. Rice, Keller, TX (US); Krishna K. Bellamkonda, McKinney, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 209 days.

(21) Appl. No.: 15/939,768

(22) Filed: Mar. 29, 2018

(65) Prior Publication Data

US 2019/0306742 A1 Oct. 3, 2019

(51) Int. Cl.
*H04W 28/02* (2009.01)
*H04W 40/12* (2009.01)

(52) U.S. Cl.
CPC ... *H04W 28/0236* (2013.01); *H04W 28/0215* (2013.01); *H04W 28/0226* (2013.01); *H04W 40/12* (2013.01)

(58) Field of Classification Search
CPC ......... H04W 28/0215; H04W 28/0221; H04W 28/0226; H04W 28/0231; H04W 28/0236; H04W 28/0242; H04W 28/0247; H04W 28/0252; H04W 28/0257; H04W 28/0263; H04W 28/0268; H04W 40/12; H04W 48/18
See application file for complete search history.

(56) References Cited

U.S. PATENT DOCUMENTS

| | | | |
|---|---|---|---|
| 9,961,624 B1 * | 5/2018 | Zait | H04W 8/20 |
| 2017/0289882 A1 * | 10/2017 | Faccin | H04W 36/14 |
| 2017/0367036 A1 * | 12/2017 | Chen | H04L 43/08 |
| 2018/0115945 A1 * | 4/2018 | Lee | H04W 24/02 |
| 2018/0211364 A1 * | 7/2018 | Nam | G06F 3/147 |
| 2018/0227843 A1 * | 8/2018 | Wu | H04L 12/14 |
| 2018/0270682 A1 * | 9/2018 | Zacharias | H04W 24/10 |
| 2019/0297659 A1 * | 9/2019 | Huang | H04W 72/1263 |
| 2019/0357199 A1 * | 11/2019 | Ali | H04L 5/001 |
| 2019/0380088 A1 * | 12/2019 | Takano | H04W 48/16 |

* cited by examiner

*Primary Examiner* — Robert C Scheibel

(57) ABSTRACT

A network device implements a control node that receives an indication of a session associated with a user equipment (UE), wherein the network device is connected to a Long Term Evolution (LTE) network, and the LTE network is interconnected with a Next Generation (Next Gen) Network. The control node determines one or more parameters associated with at least one of: a relative traffic loading of the LTE network and the Next Gen Network, a quantity of first cells within the LTE network and a quantity of second cells within the Next Gen Network, a movement status of the UE, a quantity of data associated with the session, or a latency sensitivity of the session. The control node causes the session to be selectively routed to the UE via either the LTE network or the Next Gen Network, or via both the LTE network and the Next Gen Network, based on the one or more determined parameters.

20 Claims, 12 Drawing Sheets

RESOURCE MANAGEMENT FOR INTERWORKING BETWEEN LTE AND NEXT GENERATION MOBILE NETWORKS

BACKGROUND

Long Term Evolution (LTE) is a mobile telecommunications standard for wireless communication involving mobile user equipment, such as mobile devices and data terminals. LTE networks include existing Fourth Generation (4G), and 4.5 Generation (4.5G) wireless networks.

Next Generation mobile networks, such as Fifth Generation (5G) mobile networks, have been proposed as the next evolution of mobile wireless networks. Next Generation mobile networks are designed to increase data transfer rates, increase spectral efficiency, improve coverage, improve capacity, and reduce latency. The proposed 5G mobile telecommunications standard, among other features, operates in the millimeter wave bands (e.g., 28, 38, and 60 GigaHertz (GHz)), and supports more reliable, massive machine communications (e.g., machine-to-machine (M2M), Internet of Things (IoT)).

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein implement a control node that provides dual connectivity for user equipment to both of a co-located LTE mobile network and Next Generation mobile network. The control node selectively switches session data between the LTE mobile network, and the Next Generation mobile network, that both have Radio Access Networks servicing a same location in which a user equipment is currently located. The control node selectively switches the session data based on various parameters, including a device or service profile associated with the user equipment, a relative traffic loading of the LTE network and the Next Generation Mobile Network, a quantity of cells within the LTE network relative to a quantity of cells within the Next Generation Mobile Network, a movement status of the user equipment, a quantity of data associated with the session, and/or a latency sensitivity of the session.

Figure 1:
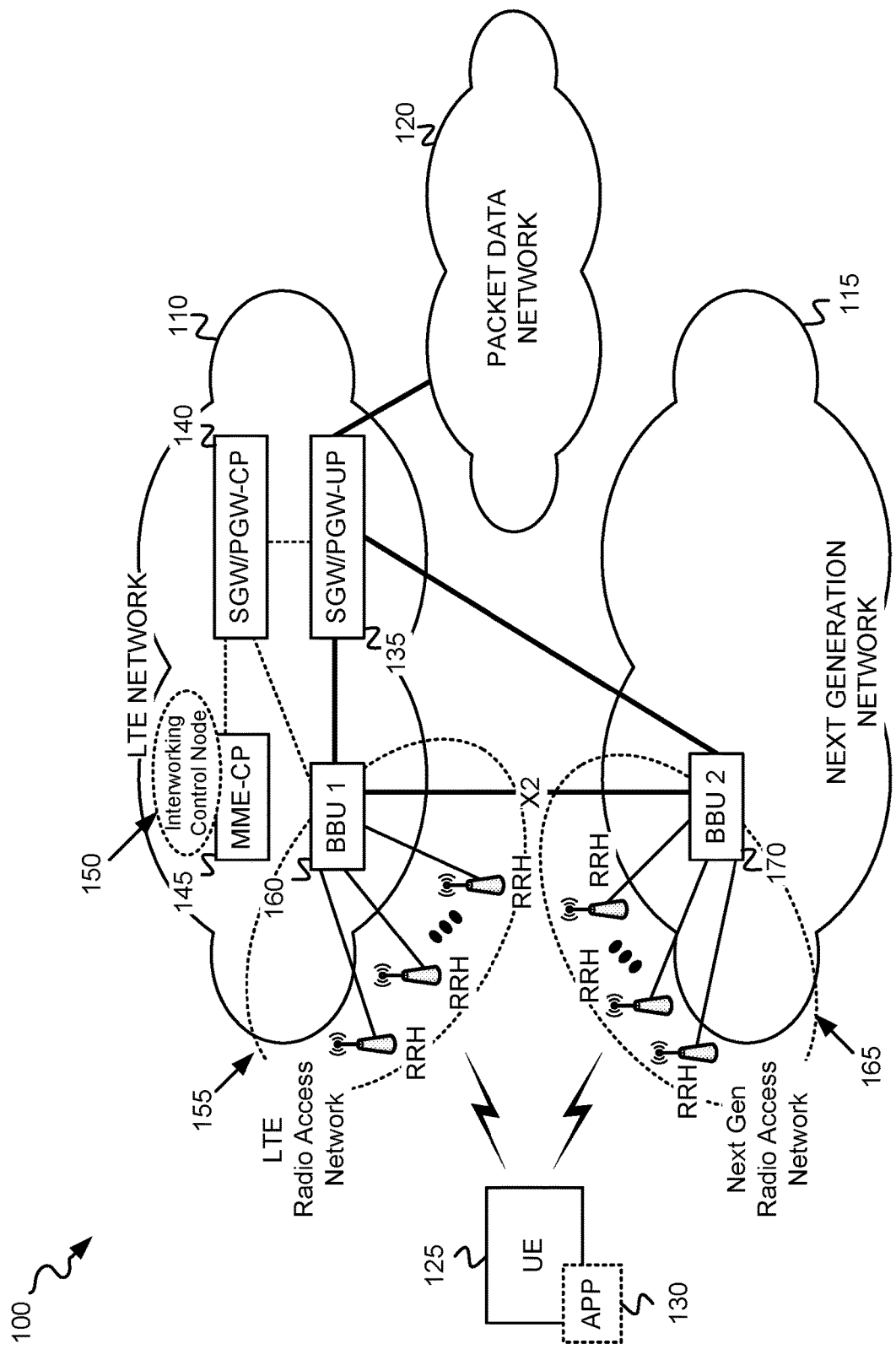
FIG. 1 is a diagram that depicts an exemplary network environment in which an interworking control node selectively switches data sessions between a LTE mobile network and a Next Generation mobile network.

FIG. 1 is a diagram that depicts an exemplary network environment 100 in which an interworking control node selectively switches data sessions between an LTE mobile network and a Next Generation mobile network based on various parameters described herein. As shown, network environment 100 includes a LTE mobile network 110, a Next Generation mobile network 115, a packet data network 120, and a user equipment 125.

LTE network 110 includes any type of a wireless public land mobile network (PLMN), or satellite network, implementing a LTE mobile telecommunications standard. In one implementation, LTE network 110 may include a PLMN implementing the 4G or 4.5G LTE standard. A "Next Generation network," referred to herein, such as Next Generation network 115, includes any type of a mobile network that implements a mobile telecommunications standard that is evolved, or has technological enhancements or improvements, relative to the LTE network 110. In one implementation, Next Generation network 115 may include at least a portion of a 5G mobile network, such as the radio access network (RAN) portion of the 5G mobile network. In a further implementation, Next Generation network 115 may include at least a portion of an nth Generation mobile network, where n is greater than five. In another implementation, Next Generation network 115 may include at least a portion of an LTE Advanced (LTE-A) network.

Packet data network 120 includes any type of packet-switched network that interconnects with LTE network 110 and/or Next Generation network 115. Packet data network 120 may include, for example, a local area network (LAN), a wide area network (WAN), a metropolitan area network (MAN), an intranet, and/or the Internet.

User equipment (UE) 125 (referred to herein as "UE 125") may include any type of computational device that communicates via networks 110, 115, and/or 120. UE 125 may include, for example, a desktop, laptop, or tablet computer; a personal digital assistant (PDA); a "smart" phone; or an "Internet of Things" (IoT) device. A "user" (not shown) may own, operate, administer, and/or carry UE 125. UE 125 may store and execute an application ("app") 130 that may track performance parameters (e.g., bandwidth, throughput, latency) and may report the tracked performance parameters to an interworking control node 150, described further below.

FIG. 1 depicts components of one exemplary implementation of LTE network 110 and Next Generation network 115. In the exemplary implementation shown, LTE network 110 includes a serving gateway (SGW)/Packet Data network Gateway (PGW)-user plane (UP) device 135, a SGW/PGW-control plane (CP) device 140, a mobility management entity-control plane (MME-CP) device 145, and a LTE Radio Access Network (RAN) 155.

SGW/PGW-UP device 135 includes a SGW/PGW that acts as a router and a gateway between LTE network 110 and packet data network 120, and forwards session data between the packet data network 120 and a base band unit in either LTE network 110 or Next Generation network 115.

SGW/PGW-CP device 140 includes a SGW/PGW that executes a packet forwarding control protocol which selects an appropriate SGW/PGW-UP device 135 for routing/packet forwarding in the user plane based on, among other factors, SGW/PGW location and UE location, SGW/PGW dynamic load, SGW/PGW capacity, and the requested Access Point Name (APN).

MME-CP device 145 may act as a main control entity for LTE network 110. MME-CP device 145 communicates with a Home Subscriber Server (HSS) (not shown in FIG. 1) for user/device authentication and for user/device profile download. MME-CP device 145 further provides UE 125 (and other UEs not shown) with mobility management and session management functions using, for example, Network Access Stratum (NAS) signaling. In the exemplary implementation depicted in FIG. 1, MME-CP device 145 implements an interworking control node 150 that operates to control the internetworking of LTE network 110 and Next Generation network 115, as described below with respect to FIGS. 3A-3E.

LTE Radio Access Network (RAN) 155 may include a first base band unit (BBU1) 160 and multiple remote radio heads (RRHs). LTE RAN 155 may include one or more additional base band units (BBUs) and RRHs not shown in FIG. 1. BBU1 145 may connect to the multiple RRHs via, for example, optical fibers. BBU1 160 includes a network device that operates as the digital function unit that transmits digital baseband signals to the multiple RRHs, and receives digital baseband signals from the multiple RRHs. BBU1 160 may be located at a fixed geographic location within LTE network 110, or may be "virtualized" within the "cloud" and may, therefore, have no fixed geographic location within LTE network 110. If BBU1 160 is connected to the multiple RRHs via, for example, optical fibers, then BBU1 160 may convert the digital baseband signals into corresponding optical signals for transmission to the RRHs, and may receive optical signals from the RRHs and convert the optical signals into corresponding digital baseband signals.

The RRHs include network devices that operate as radio function units that transmit and receive radio frequency (RF) signals to/from UEs (e.g., UE 125). If the RRHs are connected to BBU1 160 via an optic fiber, the RRHs may convert received RF signals to optical signals, and transmit the optical signals to BBU1 160. Additionally, the RRHs may receive optical signals from BBU1 160 via the optic fiber, convert the optical signals to RF signals for transmission via one or more antennas (e.g., one or more antenna arrays) of the RRHs. Each of the RRHs may include at least one antenna array, transceiver circuitry, and other hardware and software components for enabling the RRHs to receive data via wireless RF signals from UE 125, and to transmit wireless RF signals to UE 125. If LTE network 110 is a 4G LTE network, BBU1 160 and a RRH represent a distributed evolved NodeB (eNB).

As further shown in the exemplary implementation of FIG. 1, Next Generation network 115 includes a Next Generation RAN 165. Next Generation RAN 165 further includes a second base band unit (BBU2) 170 and multiple RRHs. Next Generation RAN 165 may include one or more additional BBUs and RRHs not shown in FIG. 1. BBU2 170 may connect to the multiple RRHs of Next Generation RAN 165 via, for example, optical fibers. BBU2 170 includes a network device that operates as the digital function unit that transmits digital baseband signals to the multiple RRHs, and receives digital baseband signals from the multiple RRHs. BBU2 170 may be located at a fixed geographic location within Next Generation Network 115, or may be "virtualized" within the "cloud" and may, therefore, have no fixed geographic location within Next Generation network 115. If BBU2 170 is connected to the multiple RRHs via, for example, optical fibers, then BBU2 170 may convert the digital baseband signals into corresponding optical signals for transmission to the RRHs, and may receive optical signals from the RRHs and convert the optical signals into corresponding digital baseband signals.

The RRHs include network devices that operate as radio function units that transmit and receive radio frequency (RF) signals to/from UEs (e.g., UE 125). If the RRHs are connected to BBU2 170 via an optic fiber, the RRHs may convert received RF signals to optical signals, and transmit the optical signals to BBU2 170. Additionally, the RRHs may receive optical signals from BBU2 170 via the optic fiber, convert the optical signals to RF signals for transmission via one or more antennas (e.g., one or more antenna arrays) of the RRHs. Each of the RRHs may include at least one antenna array, transceiver circuitry, and other hardware and software components for enabling the RRHs to receive data via wireless RF signals from UE 125, and to transmit wireless RF signals to UE 125. If Next Generation network 115 is a 5G New Radio (NR) network, BBU2 170 and a RRH represent a distributed Next Generation NodeB, which may also be referred to as a gNB.

The configuration of the components of the network environment 100 depicted in FIG. 1 is for illustrative purposes only, and other configurations may be implemented. Therefore, network environment 100 may include additional, fewer and/or different components, that may be configured differently, than depicted in FIG. 1 and described herein. For example, though a single UE 125 is shown in FIG. 1, network environment 100 may include multiple UEs 125, where each UE 125 may wirelessly connect to LTE network 110 and/or Next Generation network 115. Additionally, though only a single base band unit BBU 1 160, and a single base band unit BBU 2 170, are shown as components of LTE RAN 155 and Next Generation RAN 165, respectively, each of LTE RAN 155 and Next Generation RAN 165 may include multiple base band units (i.e., >1 base band unit), with each of the multiple base band units further connecting to at least one RRH.

Figure 2:
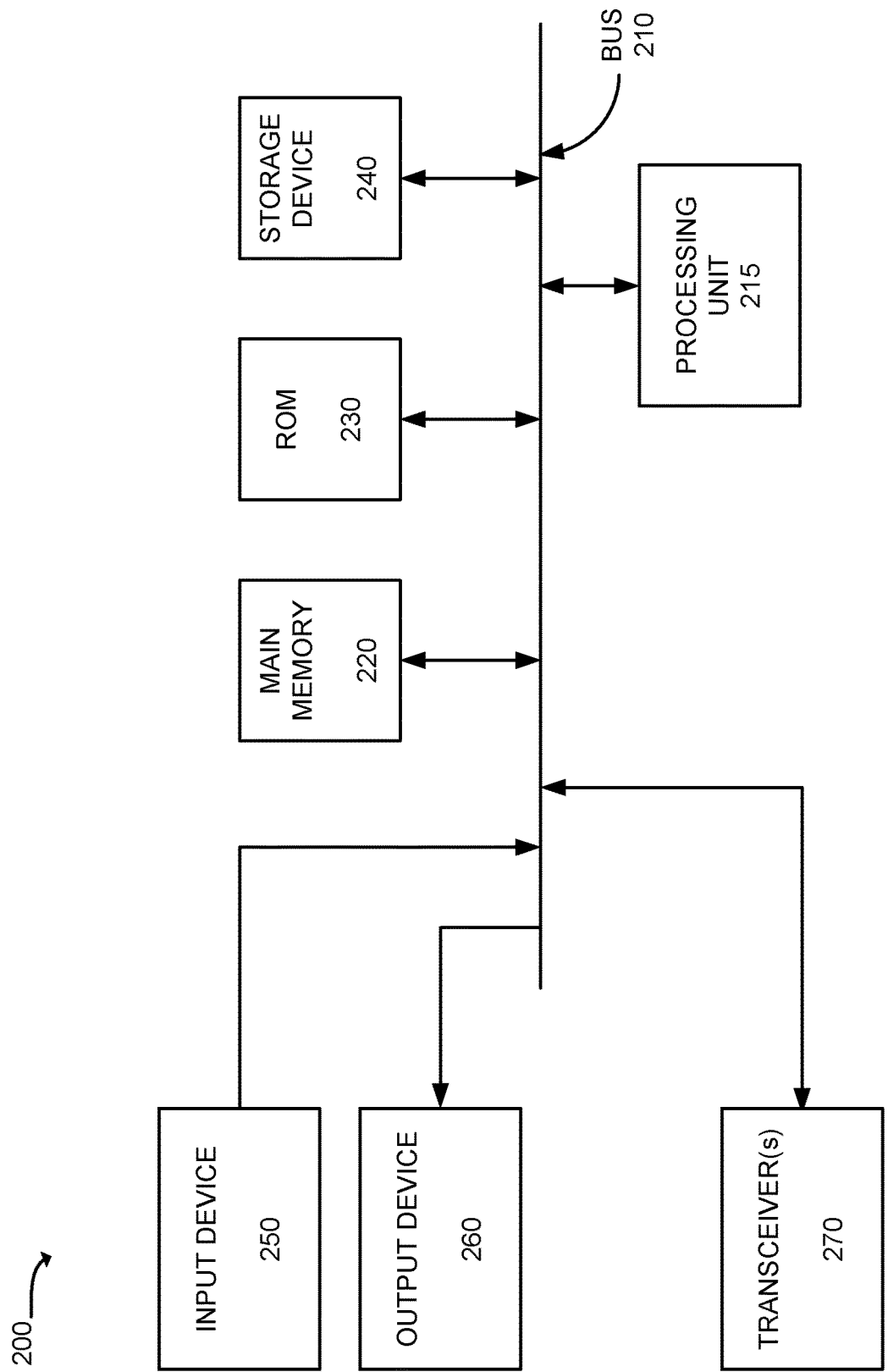
FIG. 2 is a diagram of exemplary components of a network device that may correspond to various devices shown in FIG. 1.

FIG. 2 is a diagram of exemplary components of a network device 200. Network device 200 may correspond to SGW/PGW-UP 135, SGW/PGW-CP 140, MME-CP 145, interworking control node 150, BBU 1 160, BBU 2 170 and/or UE 125. Network device 200 may include a bus 210, a processing unit 215, a main memory 220, a read only memory (ROM) 230, a storage device 240, an input device 250, an output device 260, and a transceiver(s) 270. Bus 210 may include a path that permits communication among the elements of network device 200.

Processing unit 215 may include one or more processors or microprocessors which may interpret and execute stored instructions associated with one or more processes, or processing logic that implements the one or more processes. For example, processing unit 215 may include, but is not limited to, programmable logic such as Field Programmable Gate Arrays (FPGAs) or accelerators. Processing unit 215 may include software, hardware, or a combination of software and hardware for executing the processes described herein. Main memory 220 may include a random access memory (RAM) or another type of dynamic storage device that may store information and, in some implementations, instructions for execution by processing unit 215. ROM 230 may include a Read Only Memory (ROM) device or another type of static storage device (e.g., Electrically Erasable Programmable ROM (EEPROM)) that may store static information and, in some implementations, instructions for use by processing unit 215. Storage device 240 may include a magnetic and/or optical recording medium and its corresponding drive. Main memory 220, ROM 230 and storage device 240 may each be referred to herein as a "non-transitory computer-readable medium" or a "non-transitory storage medium."

Input device 250 may include one or more devices that permit a user or operator to input information to network device 200, such as, for example, a keypad or a keyboard, a display with a touch sensitive panel, voice recognition and/or biometric mechanisms, etc. Output device 260 may include one or more devices that output information to the operator or user, including a display, a speaker, etc. Input device 250 and output device 260 may, in some implementations, be implemented as a graphical user interface (GUI) that displays GUI information and which receives user input via the GUI. In some implementations, such as when network device 200 is a SGW/PGW-UP 135, SGW/PGW-CP 140, or MME-CP 145, input device 250 and/or output device 260 may be omitted from network device 200.

Transceiver(s) 270 may include one or more transceivers that enable network device 200 to communicate with other devices and/or systems. For example, in the case where network device 200 is a UE 125, transceiver(s) 270 may include a wireless transceiver (including at least one antenna) for communicating with one or more RRHs of LTE RAN 155 or Next Generation RAN 165. In some implementations, transceiver(s) 270 may include a Global Positioning System (GPS) device that can determine the geographic location of network device 200 (e.g., a current geographic location of a UE 125). In the cases of SGW/PGW-UP 135, SGW/PGW-CP 140, MME-CP 145, BBU 1 160 and BBU 2 170, transceiver(s) 270 may include at least one wired transceiver for wired communication via LTE network 110 and/or Next Generation network 115. In some implementations, transceiver(s) 270 of BBU 1 160 and BBU 2 170 may include one or more optical transceivers for communicating with RRHs via optical fiber.

Network device 200 may perform certain operations or processes, as may be described herein. Network device 200 may perform these operations in response to processing unit 215 executing software instructions contained in a computer-readable medium, such as memory 220. A computer-readable medium may be defined as a physical or logical memory device. A logical memory device may include memory space within a single physical memory device or spread across multiple physical memory devices. The software instructions may be read into main memory 220 from another computer-readable medium, such as storage device 240, or from another device via transceiver(s) 270. The software instructions contained in main memory 220 may cause processing unit 215 to perform the operations or processes, as described herein. Alternatively, hardwired circuitry (e.g., logic hardware) may be used in place of, or in combination with, software instructions to implement the operations or processes, as described herein. Thus, exemplary implementations are not limited to any specific combination of hardware circuitry and software.

The configuration of components of network device 200 illustrated in FIG. 2 is for illustrative purposes only. Other configurations may be implemented. Therefore, network device 200 may include additional, fewer and/or different components, arranged in a different configuration, than depicted in FIG. 2.

FIGS. 3A-3E are flow diagrams that illustrate an exemplary process for controlling the internetworking of LTE mobile network 110 and Next Generation mobile network 115 based on various parameters associated with a UE 125's session, traffic loading of the LTE network 110 and Next Generation network 115, relative cell coverage and/or cell quantity of LTE network 110 and Next Generation network 115, and/or other parameters. The exemplary process of FIGS. 3A-3E may be implemented by processing unit 215 of interworking control node 150. The exemplary process of FIGS. 3A-3E is described with reference to FIGS. 4-6.

The exemplary process includes interworking control node 150 determining if there is a new session involving UE 125 (block 300). Control node 150 may, for example, receive an indication via SGW/PGW-CP 140 that packets associated with a new session have been received that are destined for UE 125. In some implementations, control node 150 may receive header information extracted from the packets of the new session that includes various parameters that may be analyzed and used for selectively switching the new session between LTE network 110 and Next Generation network 115, as described in further detail below.

Interworking control node 150 obtains a device and/or service profile associated with the UE 125 (block 305). Control node 150 may send a request to the Home Subscriber Server (HSS) to obtain a device profile associated with the UE 125 and/or a service profile associated with the user of UE 125. The device profile may, for example, indicate whether UE 125 is Next Generation network capable (i.e., UE 125 has the hardware and software to enable it to wirelessly transmit and receive RF signals via Next Generation mobile network 115 using the appropriate Next Generation wireless standard, such as 5G). The service profile may, for example, indicate whether the user of the UE 125 has a network subscription that permits access to Next Generation network 115.

Interworking control node 150 determines if LTE and Next Generation network services are currently available (block 310). In some circumstances, network access to Next Generation network 115 may not currently be available to UE 125. As examples, the user of the UE 125 may not have a network subscription that grants access to Next Generation network 115, the Next Generation network 115's RAN 165 may not currently have coverage that extends to a current location of the UE 125, or the Next Generation network 115 may be currently experiencing service failures that are disrupting service to UE 125 at UE 125's current location.

Figure 4:
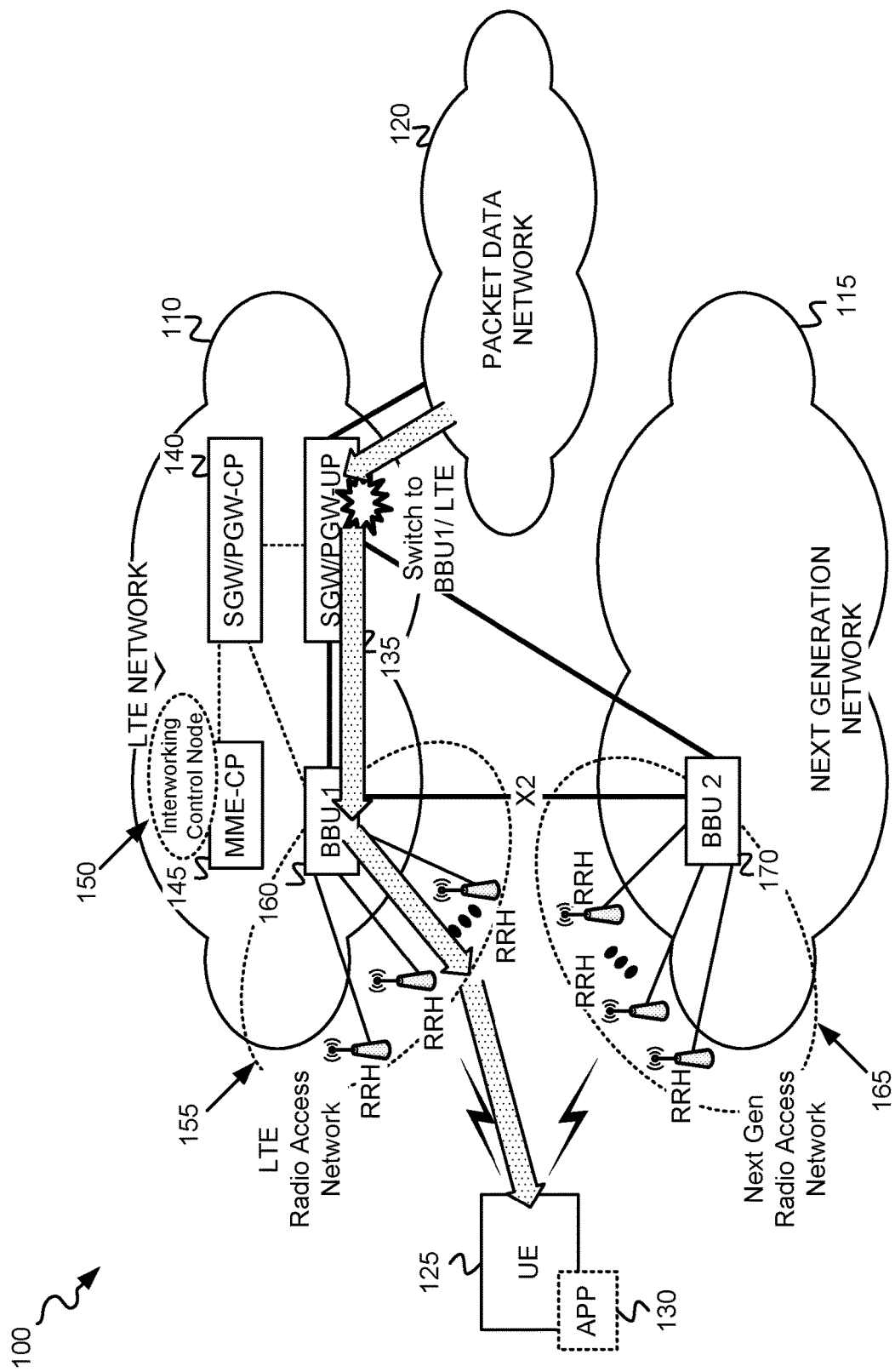
FIGS. 4, 5A, 5B, 6A and 6B depict examples of switching of a data session/data sessions between the LTE network and the Next Generation mobile network of FIG. 1.

If Next Generation network services are not currently available (NO—block 315), then interworking control node 150 causes switching of the UE's session data at SGW/PGW-UP 135 to BBU 1 160 of LTE RAN 155 of LTE network 110 (block 317). FIG. 4 illustrates SGW/PGW-UP 135 receiving packet data associated with the session from packet data network 120 and, based on instructions from control node 150, switching the data to BBU1 155, for transmission to a selected RRH to UE 125.

If Next Generation network services are currently available (YES—block 315), then interworking control node 150 determines if the session involves voice or Internet Protocol Multimedia Subsystem (IMS) services (block 320). Packet header data contained in the packets of the session may indicate that the session involves a voice call or involves IMS data. Control node 150 may, therefore, analyze the packet header data of the session to identify the session as a voice call or involving IMS data. If the session involves voice or IMS services (YES—block 325) (FIG. 3B), then interworking control node 150 causes switching of the session data at SGW/PGW-UP 135 to BBU 1 160 in LTE RAN 155 of LTE network 110 (block 327). Referring again to FIG. 4, FIG. 4 depicts SGW/PGW-UP 135 receiving packet data associated with the session from packet data network 120 and, based on instructions from control node 150, switching the data to BBU1 155, for transmission to a selected RRH to UE 125.

If the session does not involve either voice or IMS services (NO—block 325) (FIG. 3B), then interworking control node 150 analyses the device and/or service profile associated with the UE 125 to determine if the UE is LTE and Next Generation capable (block 330). The device profile may, for example, indicate whether UE 125 has the hardware and software to enable it to wirelessly transmit and receive RF signals via LTE network 110, and via Next Generation network 115, using the appropriate 4G or Next Generation wireless standard (e.g., 5G NR).

If the UE 125 is not LTE and Next Generation dual connectivity capable (NO—block 335), then interworking control node 150 causes switching of the session data at SGW/PGW-UP 135 to BBU 1 160 in LTE RAN 155 of LTE network 110 (block 337). Referring again to FIG. 4, FIG. 4 depicts SGW/PGW-UP 135 receiving packet data associated with the session from packet data network 120 and, based on instructions from control node 150, switching the data to BBU1 155, for transmission to a selected RRH to UE 125.

If the UE 125 is LTE and Next Generation dual connectivity capable (YES—block 335), then interworking control node 150 determines the current relative traffic loading of LTE network 110 and Next Generation network 115 (block 340). Interworking control node 150 may obtain information, regarding the traffic loading of LTE network 110 and Next Generation network 115 from nodes in LTE network 110 and Next Generation network 115 that track and log traffic conditions within the networks. For example, one or more nodes in each of LTE network 110 and Next Generation network 115 may track and log bandwidth load, throughput, and/or latency across particular links, and/or at particular nodes, of LTE network 110 and Next Generation network 115. The one or more tracking and logging nodes may report the tracked network performance parameters (e.g., bandwidth, throughput, latency) to interworking control node 150.

Figure 3A:
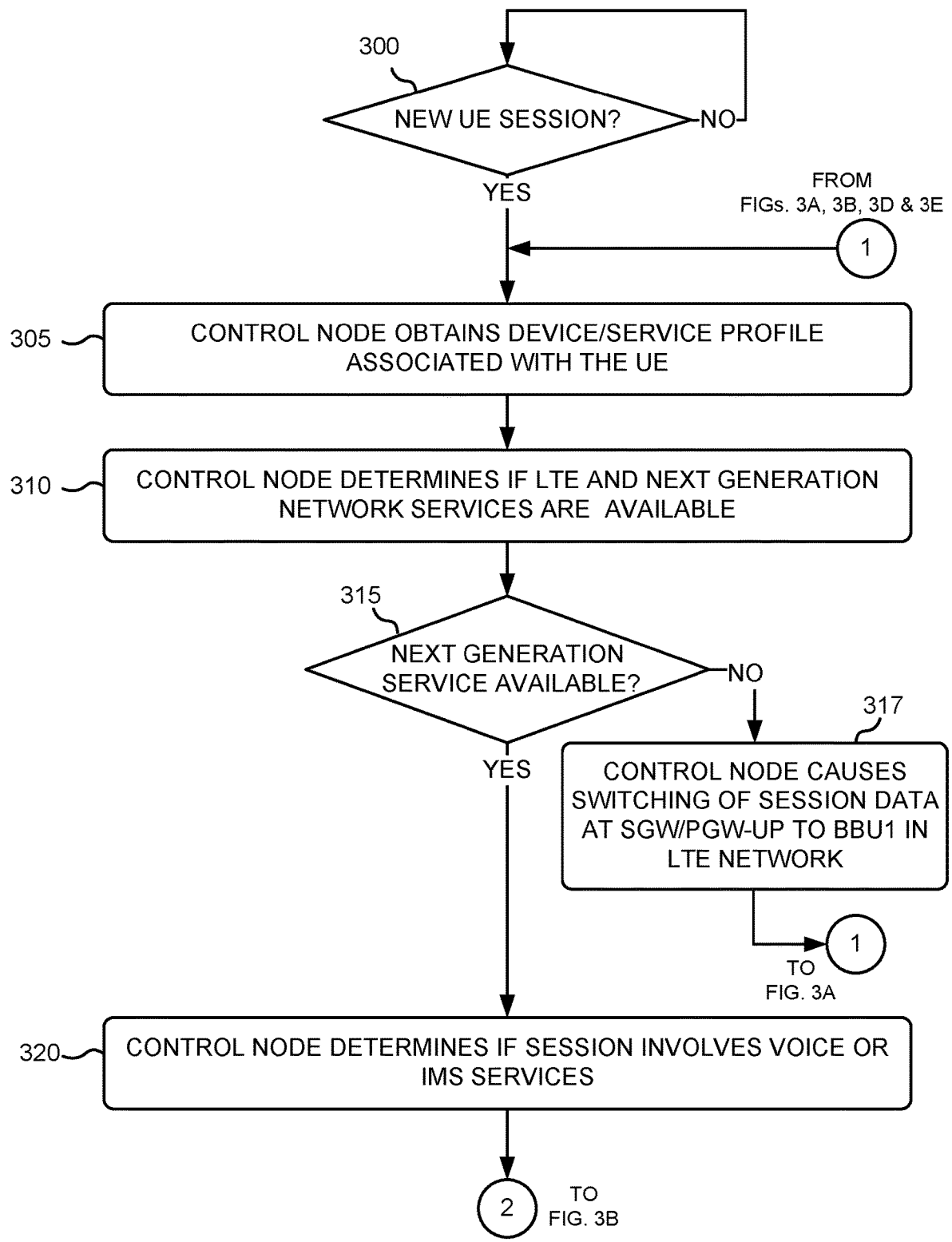
FIGS. 3A-3E are flow diagrams that illustrate an exemplary process for controlling the internetworking of the LTE mobile network and the Next Generation mobile network of FIG. 1.
Figure 3B:
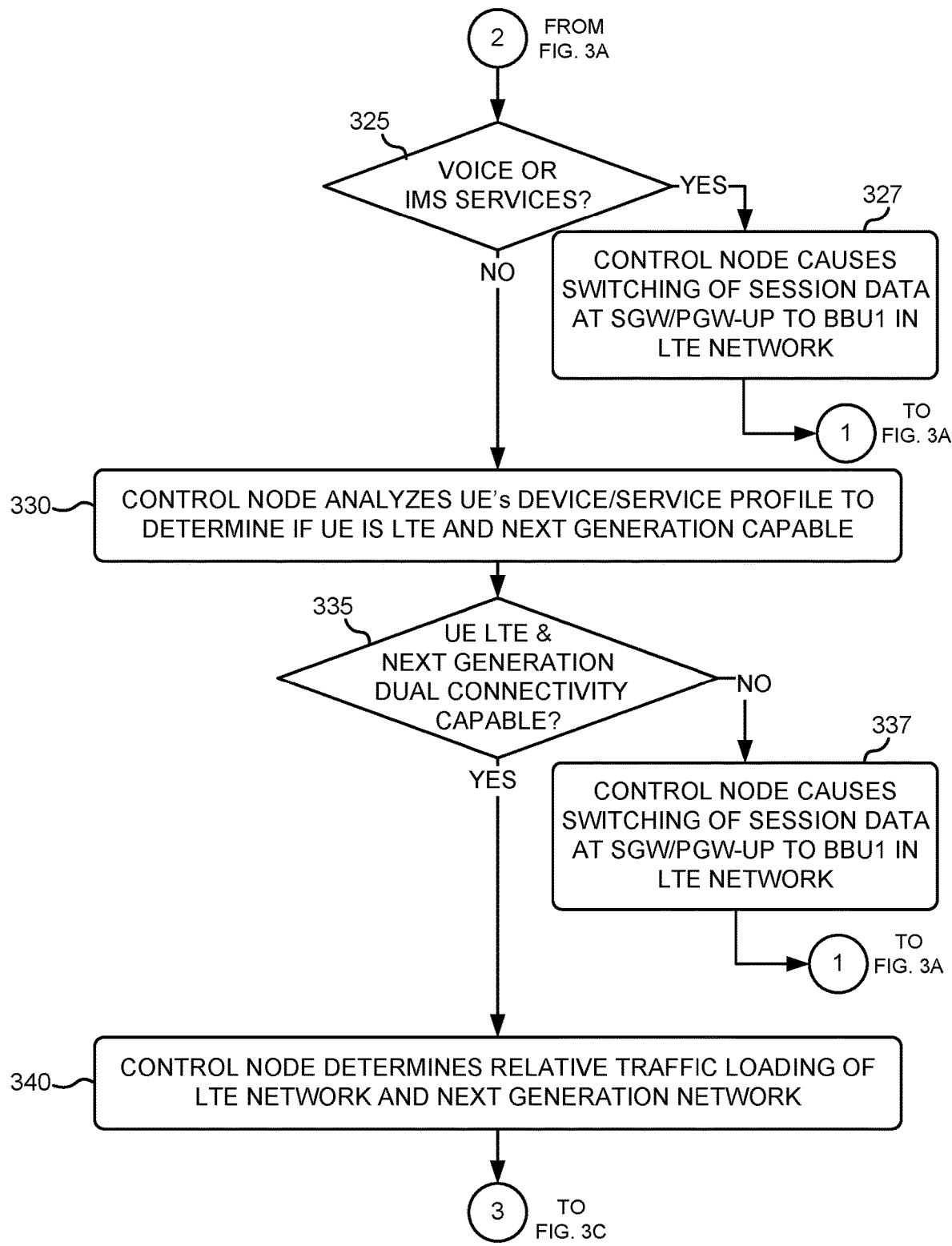
Figure 3C:
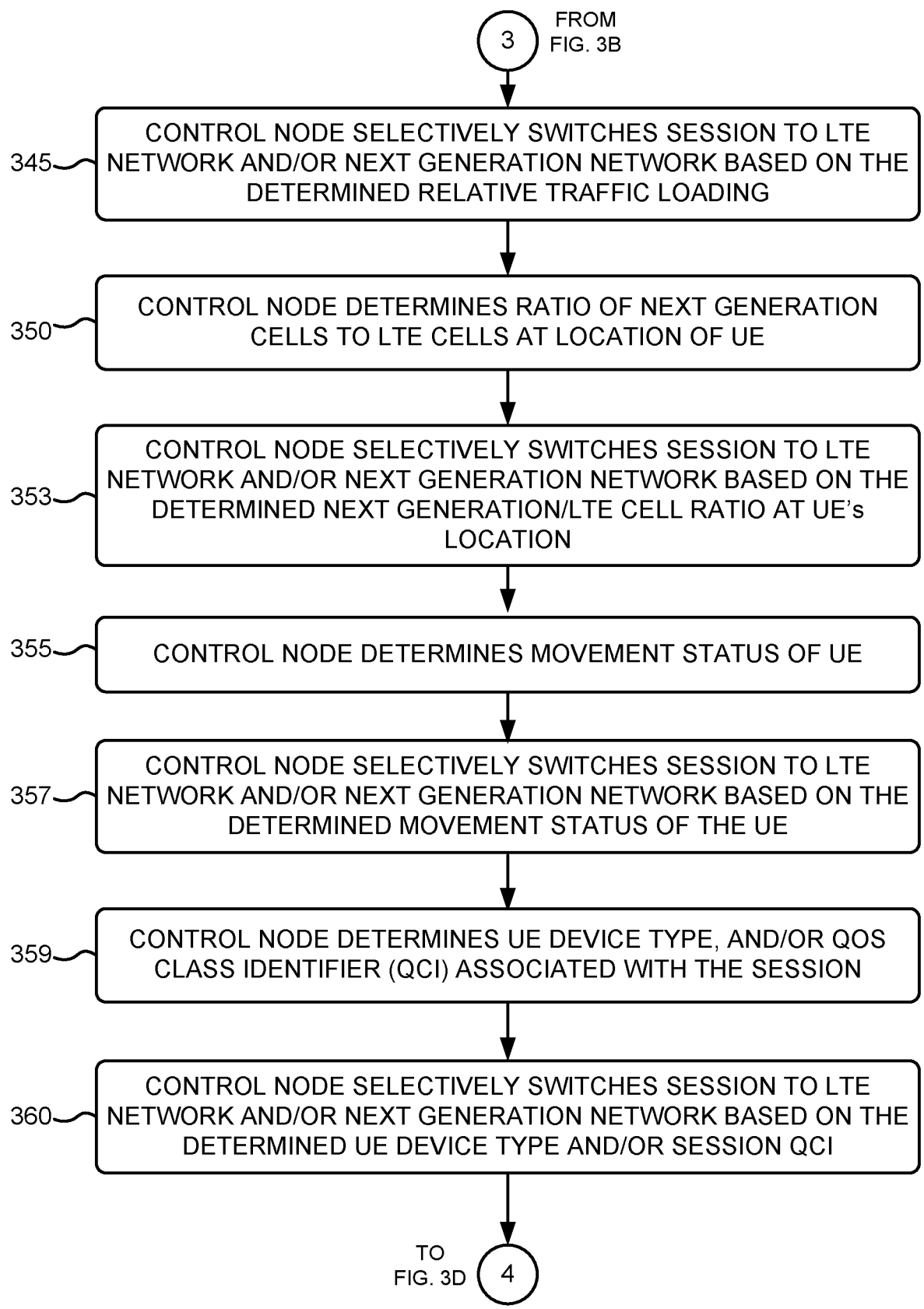
Figure 5A:
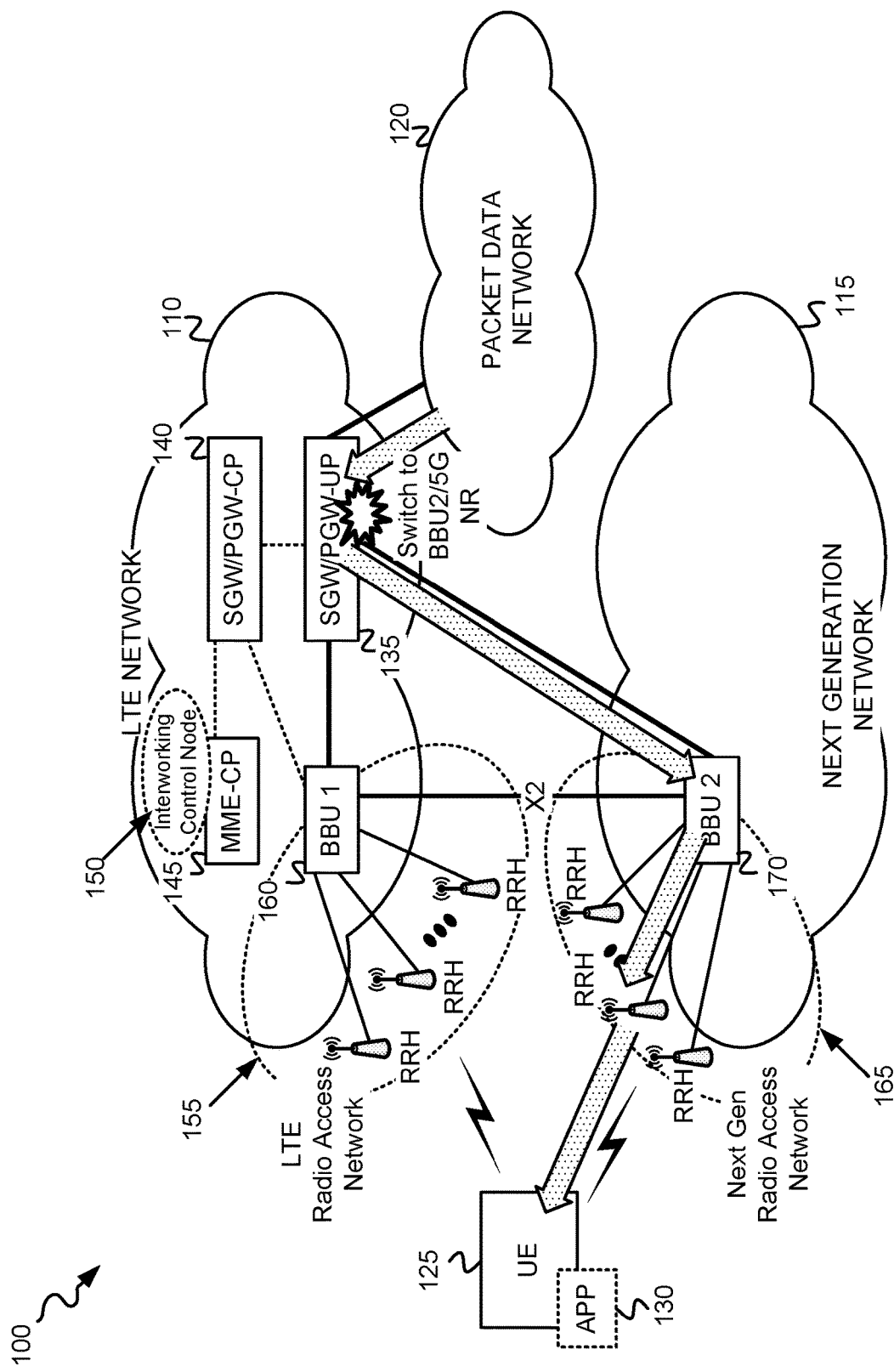
Figure 5B:
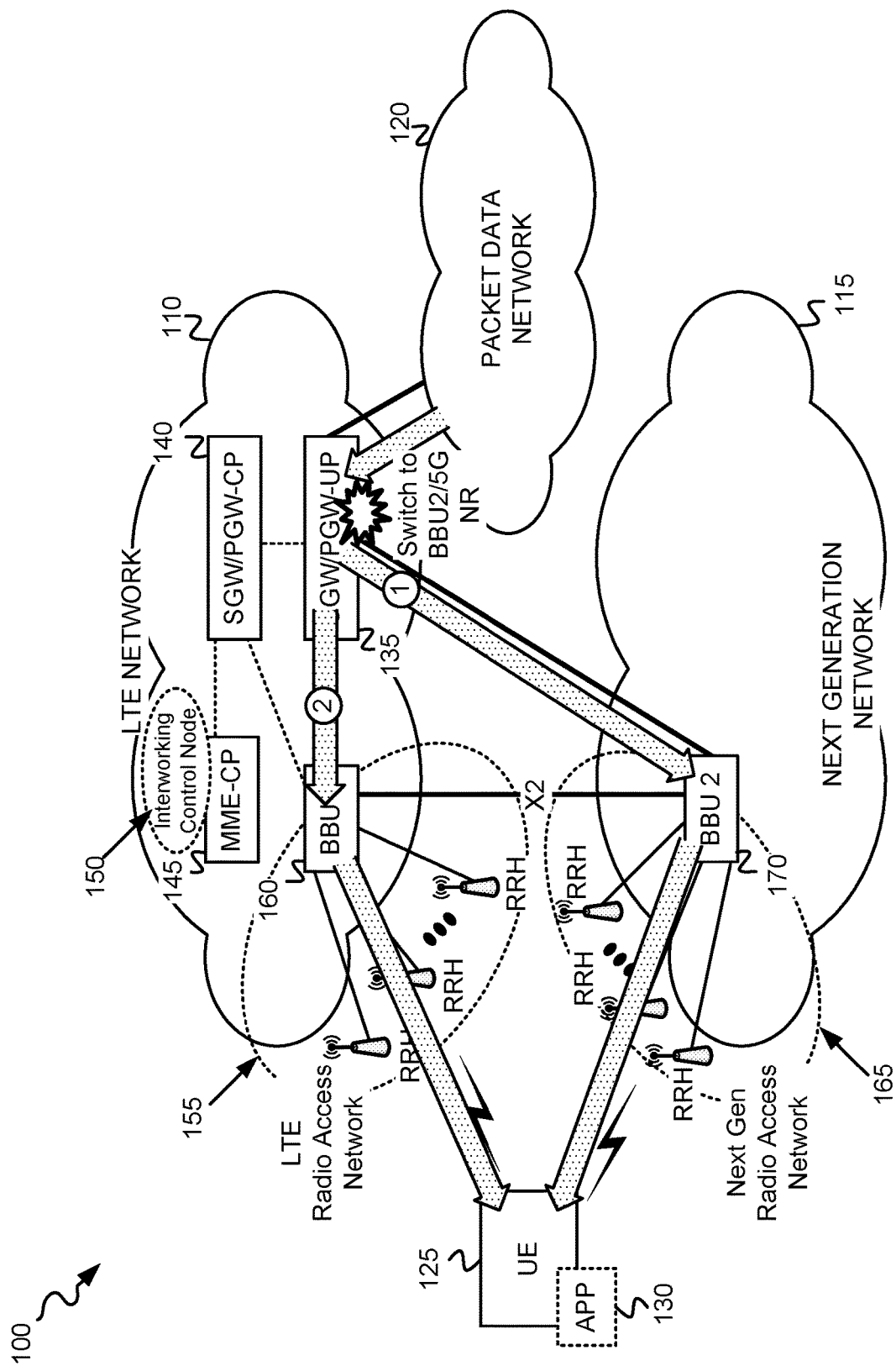

Interworking control node 150 selectively switches the UE session to LTE network 110 and/or Next Generation network 115 based on the determined relative traffic loading (block 345) (FIG. 3C). Interworking control node 105 may analyze the reported network performance parameters to determine the relative current performance (e.g., traffic loading) between LTE network 110 and Next Generation network 115. For example, interworking control node 150 may determine that a portion of Next Generation network 115 that would currently serve the location of UE 125 has a higher available bandwidth or throughput than a portion of LTE network 110 that would currently serve the location of UE 125, so interworking control node 150 causes switching of session data from SGW/PGW-UP 135 to BBU 2 170 in Next Generation network 115, such as shown in FIG. 5A. As another example, interworking control node 150 may determine that the portion of LTE network 110 that would currently serve the location of UE 125 has a higher available bandwidth or throughput than the portion of Next Generation network 115 that would currently serve the location of UE 125, so interworking control node 150 causes switching of the session data from SGW/PGW-UP 135 to BBU 1 155 in LTE network 110, such as shown in FIG. 4. Alternatively, interworking control node 150 may determine that both Next Generation network 115 and LTE network 110 have sufficient available bandwidth or throughput for serving UE 125 at UE 125's current location, so interworking control node 150 causes a portion (identified with a "1" within a circle in FIG. 5B) of the session data to be switched from SGW/PGW-UP 135 to BBU 2 170 in Next Generation network 115, and another portion (identified with a "2" within a circle) of the session data to be switched from SGW/PGW-UP 135 to BBU1 160 in LTE network 110, such as shown in FIG. 5B. This switching results in "load sharing" across LTE network 110 and Next Generation network 115. As a further alternative, the simultaneous dual LTE network 110/Next Generation network 115 connectivity of FIG. 5B may be maintained for multiple different data sessions, where a portion (identified with a "1" within a circle in FIG. 5B) of the data sessions may be switched from SGW/PGW-UP 135 to BBU 2 170 in Next Generation network 115, and another portion (identified with a "2" within a circle in FIG. 5B) of the data sessions may be switched from SGW/PGW-UP 135 to BBU1 160 in LTE network 110.

Interworking control node 150 determines a ratio of Next Generation cells to LTE cells at the location of UE 125 (block 350). Interworking control node 150 accesses an existing data store (or stores) that maintains current network resource information of LTE network 110 and Next Generation network 115. From this current network resource information, interworking control node 150 determines a number of active cells in Next Generation network 115 at the current location of UE 125, and a number of active cells in LTE network 110 at the current location of UE 125. Based on the determined number of active cells for Next Generation network 115 and LTE network 110, interworking control node 150 may calculate a ratio of active cells in Next Generation network 115 to active cells in LTE network 110.

Interworking control node 150 selectively switches the UE session to LTE network 110 and/or Next Generation network 115 based on the determined Next Generation/LTE cell ratio at the UE 125's location (block 353). For example, if the Next Generation/LTE cell ratio determined in block 350 indicates that Next Generation network 115 has at least a 10% greater number of active cells than LTE network 110, then interworking control node 150 may cause the UE session to be switched to Next Generation network 115, such as shown in FIG. 5A. Alternatively, interworking control node 150 may determine that both Next Generation network 115 and LTE network 110 have approximately an equal number of active cells for serving UE 125, so interworking control node 150 causes a portion (identified with a "1" within a circle in FIG. 5B) of the session data to be switched from SGW/PGW-UP 135 to BBU 2 170 in Next Generation network 115, and another portion (identified with a "2" within a circle) of the session data to be switched from SGW/PGW-UP 135 to BBU1 160 in LTE network 110, such as shown in FIG. 5B. This switching results in "load sharing" across LTE network 110 and Next Generation network 115. As a further alternative, the simultaneous dual LTE network 110/Next Generation network 115 connectivity of FIG. 5B may be maintained for multiple different data sessions, where a portion (identified with a "1" within a circle in FIG. 5B) of the data sessions may be switched from SGW/PGW-UP 135 to BBU 2 170 in Next Generation network 115, and another portion (identified with a "2" within a circle in FIG. 5B) of the data sessions may be switched from SGW/PGW-UP 135 to BBU1 160 in LTE network 110. Interworking control node 150 determines a movement status of the UE 125 (block 355). Interworking control node 150 may obtain geographic movement information directly from UE 125, or from another network node (e.g., MME-CP 145), that indicates UE 125's location, speed, and/or direction of movement. Interworking control node 150 selectively causes the UE's session to be switched to LTE network 110 and/or Next Generation network 115 based on the determined movement status of the UE 125 (block 357). Interworking control node 150 may compare the location, speed, and/or direction of movement of UE 125 with the known disposition of network resources of LTE network 110 and Next Generation network 115 (e.g., location of cells, density of cells at current or projected location of UE 125, etc.) to determine whether it may be necessary, to maintain sufficient network performance at UE 125, or desirable to improve network performance at UE 125, to switch the UE session from LTE network 110 to Next Generation network 115, or from Next Generation network 115 to LTE network 110. For example, if interworking control node 150 determines that the projected speed and path of UE 125 results in UE 125 entering a region of LTE network 110 with insufficiently high bandwidth or throughput, then interworking control node 150 may cause the UE session to be switched from LTE network 110 to Next Generation network 115, such as shown in FIG. 5A. Alternatively, interworking control node 150 may determine that the projected speed and path of UE 125 results in UE 125 entering a region of LTE network 110 and Next Generation network 115 with approximately equal bandwidth or throughput, then interworking control node 150 causes a portion (identified with a "1" within a circle in FIG. 5B) of the session data to be switched from SGW/PGW-UP 135 to BBU 2 170 in Next Generation network 115, and another portion (identified with a "2" within a circle) of the session data to be switched from SGW/PGW-UP 135 to BBU1 160 in LTE network 110, such as shown in FIG. 5B. This switching results in "load sharing" across LTE network 110 and Next Generation network 115. As a further alternative, the simultaneous dual LTE network 110/Next Generation network 115 connectivity of FIG. 5B may be maintained for multiple different data sessions, where a portion (identified with a "1" within a circle in FIG. 5B) of the data sessions may be switched from SGW/PGW-UP 135 to BBU 2 170 in Next Generation network 115, and another portion (identified with a "2" within a circle in FIG. 5B) of the data sessions may be switched from SGW/PGW-UP 135 to BBU1 160 in LTE network 110.

Interworking control node 150 determines a device type of the UE 125, and/or a Quality of Service (QoS) Class Identifier (QCI) associated with the session (block 359). Control node 150 may analyze the device profile of UE 125 obtained in block 305 to determine a type of the device. The type of device may include, for example, whether the device is a laptop computer, a desktop computer, a tablet computer, a "smart" phone, or a personal digital assistant (PDA). The QCI may identify the required, or requested, QoS for the session. Interworking control node 150 selectively switches the session to LTE network 110 and/or Next Generation network 115 based on the determined UE device type and/or the session QCI (block 360). Interworking control node 150 accesses an existing data store (or stores) that maintains current network resource information of LTE network 110 and Next Generation network 115 (e.g., location, and number, of BBUs and RRHs), and current network state information of LTE network 110 and Next Generation network 115 (e.g., network loading information, network node failure information, etc.). From this current network resource information and network state information, interworking control node 150 determines which of LTE network 110 or Next Generation network 115 can best meet the requirements of the QCI associated with the session. Control node 150 then selectively switches the session to either the LTE network 110 or the Next Generation network 115 based on which network is determined to be able to meet the requirements of the QCI associated with the session. For example, if interworking control node 150 determines, based on current network resource information and network state information, that Next Generation network 115 can best currently meet the requirements of the QCI associated with UE 125's session, then interworking control node 150 may cause the UE session to be switched from LTE network 110 to Next Generation network 115, such as shown in FIG. 5A. Alternatively, interworking control node 150 may determine that load sharing between LTE network 110 and Next Generation network 115 may meet the requirements of the QCI associated with the UE 125's session, and interworking control node 150, therefore, may cause a portion (identified with a "1" within a circle in FIG. 5B) of the session data to be switched from SGW/PGW-UP 135 to BBU 2 170 in Next Generation network 115, and another portion (identified with a "2" within a circle) of the session data to be switched from SGW/PGW-UP 135 to BBU1 160 in LTE network 110, such as shown in FIG. 5B. As a further alternative, the LTE network 110/Next Generation network 115 load sharing of FIG. 5B may be maintained for multiple different data sessions, where a portion (identified with a "1" within a circle in FIG. 5B) of the data sessions may be switched from SGW/PGW-UP 135 to BBU 2 170 in Next Generation network 115, and another portion (identified with a "2" within a circle in FIG. 5B) of the data sessions may be switched from SGW/PGW-UP 135 to BBU1 160 in LTE network 110.

Figure 3D:
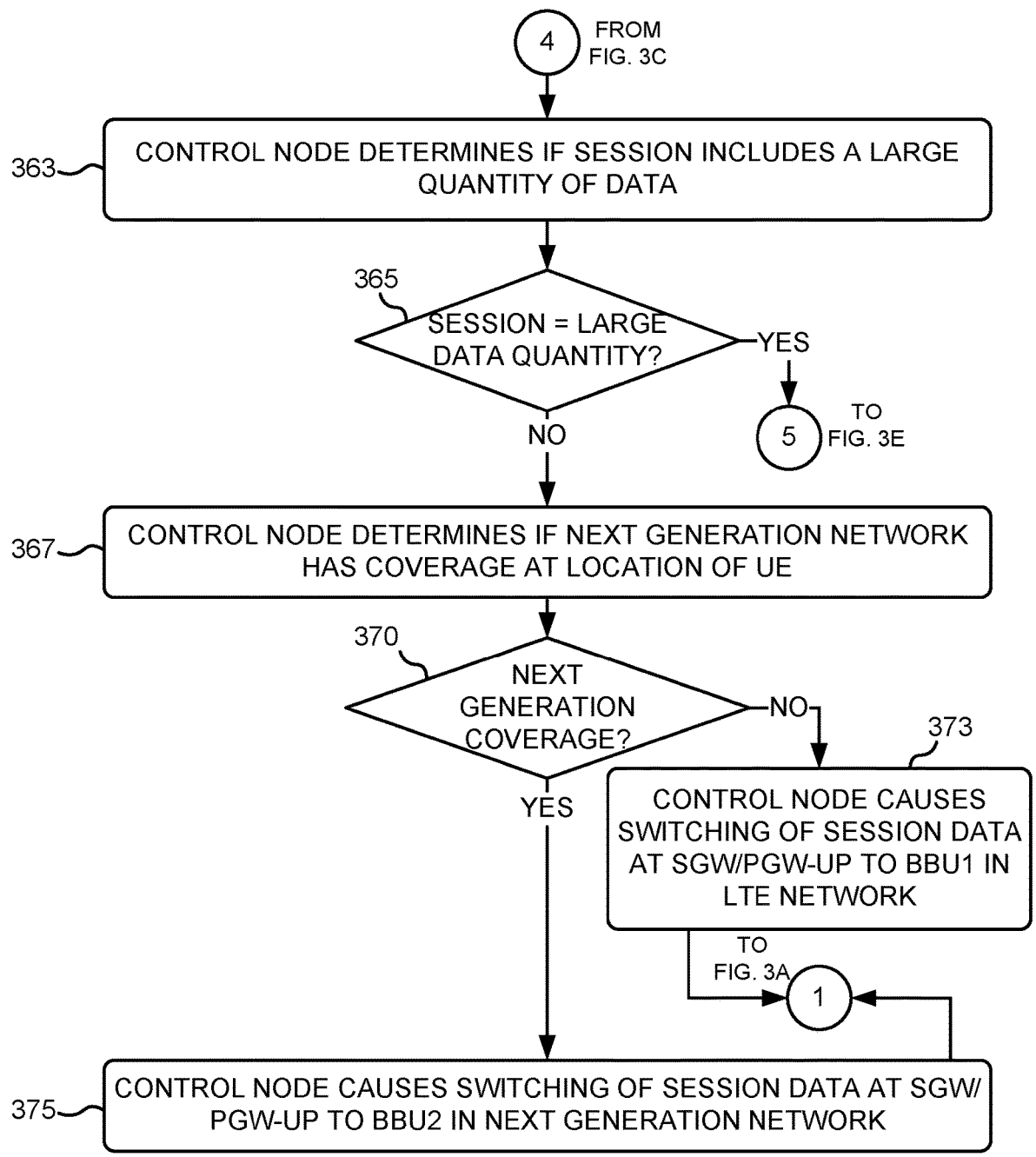

Interworking control node 150 determines if the session includes a large quantity of data (block 363) (FIG. 3D). The packet header data contained in the session indicates a type of the session data, such as audio data (i.e., a voice call), video data (e.g., streaming video), or multimedia data (e.g., web browsing data). Interworking control node 150 may determine that the session constitutes a large quantity of data based on the type of data contained in the session. For example, a streaming video session, that includes both high definition video and audio, may be determined to involve a large quantity of session data.

Figure 3E:
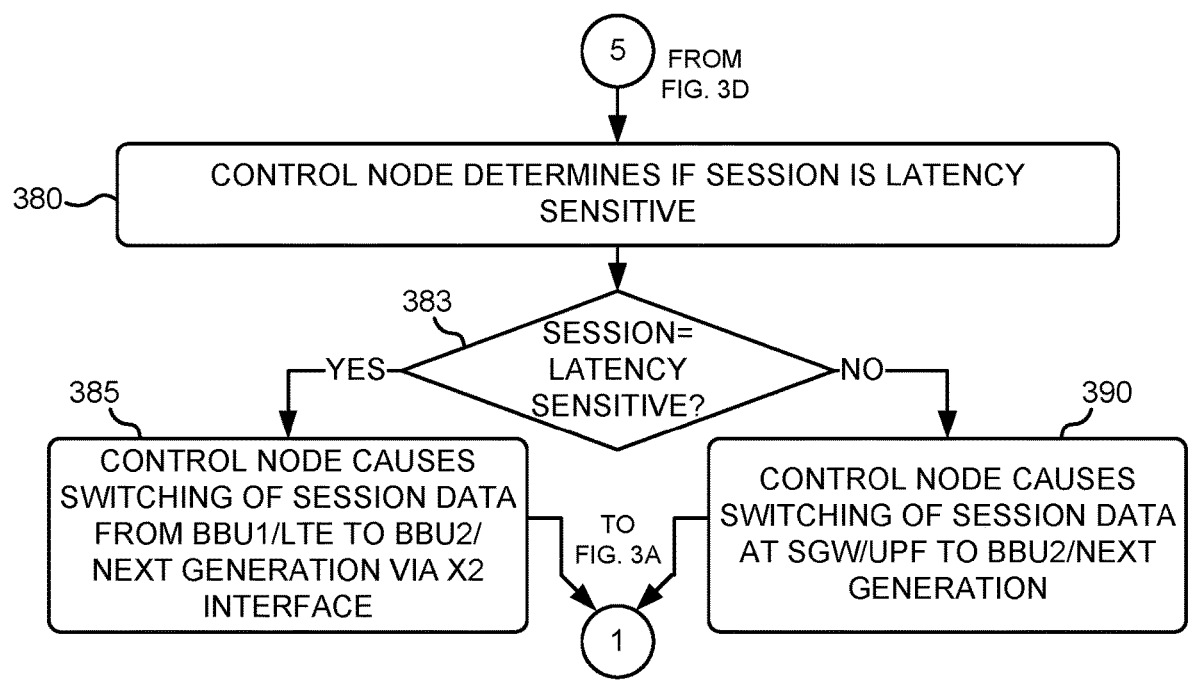
Figure 6A:
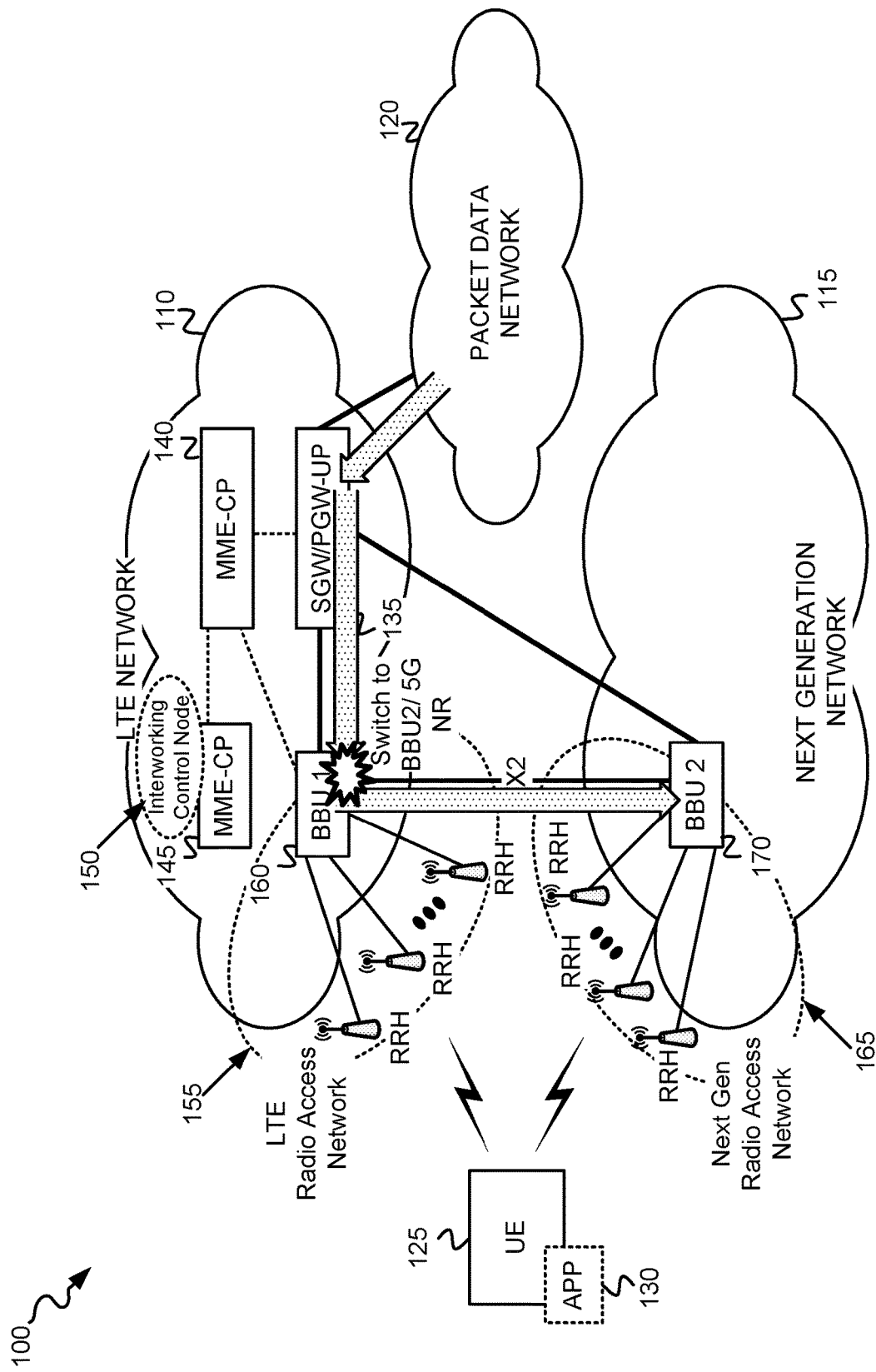
Figure 6B:
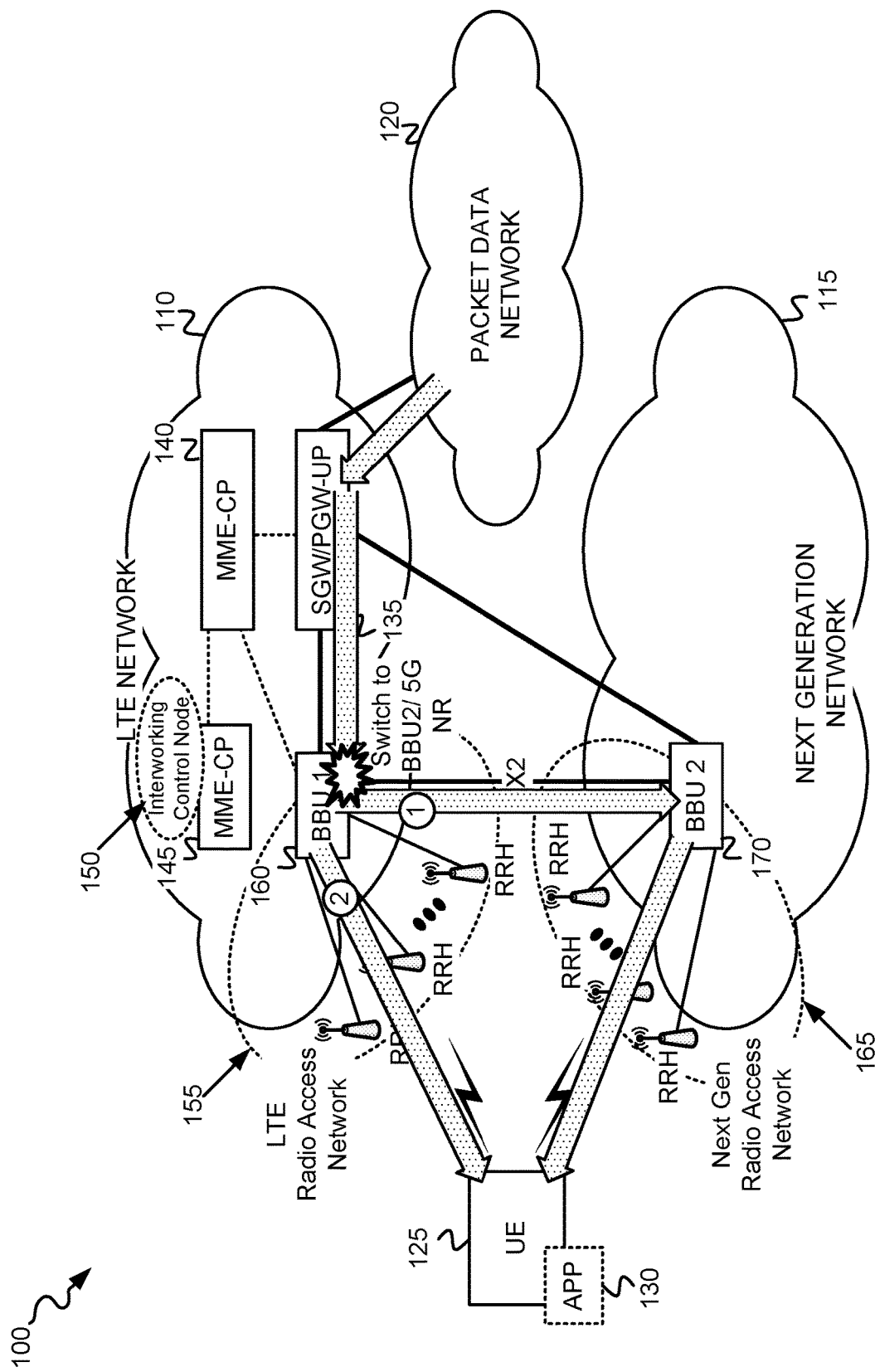

If the UE's session includes a large quantity of data (YES—block 365), then interworking control node 150 determines if the UE's session is latency sensitive (block 380)(FIG. 3E). A session is latency sensitive if delay, or slowing, of the speed of transmission of the packets during the session significantly impacts the quality of the session at the UE 125. For example, a certain level of latency during a streaming audio or video session may cause breaks in the audio or video stream, thereby, impacting the quality of the audio or video at the UE 125. If the session is latency sensitive (YES—block 383), then interworking control node 150 causes switching of session data from BBU 1 160 in LTE RAN 155 of LTE network 110 to BBU 2 170 of Next Generation RAN 165 of Next Generation network 115 via the X2 interface (block 385). FIG. 6A depicts an example of a session being switched from BBU 1 160 in LTE RAN 155 to BBU 2 170 in Next Generation RAN 165. Switching of the session at the BBUs of LTE network 110 and Next Generation network 115, instead of at SGW/PGW-UP 135 reduces delays induced in the session data. Alternatively, as shown in FIG. 6B, LTE network 110/Next Generation network 115 load sharing may be initiated, where a portion (identified with a "1" within a circle in FIG. 6B) of multiple data sessions, or a portion of a single data session, may be switched from BBU 1 160 of LTE RAN 155 in LTE network 110 to BBU 2 170 of Next Generation RAN 165 of Next Generation network 115 via the X2 interface, and another portion (identified with a "2" within a circle in FIG. 6B) of the multiple data sessions, or another portion of the single data session, may be switched from BBU 1 160 to a RRH of LTE RAN 155, and on to UE 125.

If the session is not latency sensitive (NO—block 383), the interworking control node 150 causes switching of session data at SGW/PGW-UP 135 to BBU 2 170 of Next Generation RAN 165 of Next Generation network 115 (block 390). Since the session is not latency sensitive, delays induced in the session data by switching the session at SGW/PGW-UP 135 will not significantly impact the session at UE 125. FIG. 5 depicts the UE session being switched from SGW/PGW-UP 135 to BBU 2 170.

Returning to block 365 (FIG. 3D), if the UE's session does not include a large data quantity (NO—block 365), then interworking control node 150 determines if the Next Generation network 115 has coverage at the particular location of UE 125 (block 367). Interworking control node 105 may analyze the known disposition of cells, at the current location of UE 125, in LTE network 110 and Next Generation network 115 to identify if LTE network 110 and Next Generation network 115 both have cell coverage at the current location of UE 125.

If the Next Generation network 115 does not have coverage at the particular location of UE 125 (NO—block 370), then interworking control node 150 causes switching of session data at SGW/PGW-UP 135 to BBU 1 160 in LTE RAN 155 of LTE network 110 (block 373). FIG. 4 depicts switching of a data session from SGW-PGW-UP 135 to BBU 1 160 in LTE network 110. If the Next Generation network 115 has coverage at the particular location of UE 125 (YES—block 370), then interworking control node 150 causes switching of session data at SGW/PGW-UP 135 to BBU 2 170 in Next Generation RAN 165 of Next Generation network 115 (block 375). FIG. 5A depicts the switching of session data from SGW/PGW-UP 135 to BBU 2 170 of Next Generation network 115. Alternatively, LTE network 110/Next Generation network 115 load sharing (shown in FIG. 5B) may be initiated, where a portion (identified with a "1" within a circle in FIG. 5B) of multiple data sessions, or a portion of a single data session, may be switched from SGW/PGW-UP 135 to BBU 2 170 in Next Generation network 115, and another portion (identified with a "2" within a circle in FIG. 5B) of the multiple data sessions, or another portion of the single data session, may be switched from SGW/PGW-UP 135 to BBU1 160 in LTE network 110, such as shown in FIG. 5B.

The exemplary process of FIGS. 3A-3E may be executed continuously (e.g., as a background process at interworking control node 150), periodically (e.g., on a millisecond interval) based on a timer value, or at the occurrence of one or more particular events (e.g., an LTE or Next Generation network failure, an extreme traffic loading event, etc.) for each currently active data session. In some implementations, the exemplary process of FIGS. 3A-3E may be executed only once for each new session, or may be executed periodically during an ongoing session (e.g., multiple times during the session, depending on a timer value). In these implementations, blocks 317, 327, 337, 373, 385, and 390 represent final blocks in the process (i.e., the process does not return to block 305). In other implementations in which the process of FIGS. 3A-3E executes continuously for each session, the process, upon completion of blocks 317, 327, 337, 373, 385, and 390, returns to block 305 to re-execute the blocks of the process for the session. In these implementations, the exemplary process may selectively switch the on-going UE session between LTE network 110 and Next Generation network 115 based on continuously updated parameters. In additional implementations, the exemplary process of FIGS. 3A-3E may be executed for each network slicing associated with Next Generation mobile network 115.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with respect to FIGS. 3A-3E, and message/operation flows with respect to FIGS. 4-6, the order of the blocks and/or message/operation flows may be varied in other implementations.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, at a control node in a Long Term Evolution (LTE) network, an indication of a session associated with a user equipment (UE), wherein the LTE network is interconnected with a Next Generation Mobile Network;
   determining, by the control node, one or more parameters associated with at least one of:
   a) a relative traffic loading of the LTE network and the Next Generation Mobile Network,
   b) a quantity of first cells within the LTE network and a quantity of second cells within the Next Generation Mobile Network,
   c) a movement status of the UE,
   d) a quantity of data associated with the session, or
   e) a latency sensitivity of the session;
   determining, by the control node and based on the one or more parameters, whether the LTE network or the Next Generation Mobile Network can best support the session;
   causing, by the control node, the session to be selectively routed to the UE while the session is ongoing via either the LTE network or the Next Generation Mobile Network in response to determining whether the LTE network or the Next Generation Mobile Network can best support the session; and causing, by the control node, the session to be routed to the UE while the session is ongoing via both the LTE network and the Next Generation Mobile network in response to determining that the LTE network and the Next Generation Mobile Network can support the session approximately equally or that load sharing between the LTE network and the Next Generation Mobile Network can best support the session.

2. The method of claim 1, further comprising:
determining service availability of the LTE network and the Next Generation Mobile Network,
wherein determining whether the LTE network or the Next Generation Mobile Network can best support the session, is based on the determined service availability of the LTE network and the Next Generation Mobile Network.

3. The method of claim 1, further comprising:
determining a type of mobile service associated with the session,
wherein determining whether the LTE network or the Next Generation Mobile Network can best support the is based on the determined type of mobile service associated with the session.

4. The method of claim 3, wherein determining the type of mobile service associated with the session comprises:
determining whether the type of mobile service is a voice service or an Internet Protocol Multimedia Subsystem (IMS) service, and
wherein causing the session to be selectively routed via either the LTE network or the Next Generation Mobile Network further comprises:
causing the session to be routed to the LTE network if the type of mobile service is the voice service or the IMS service.

5. The method of claim 1, further comprising:
determining if the UE is dual connectivity capable such that the UE is capable of wirelessly connecting to the LTE network and to the Next Generation Mobile Network, and
causing the session to be routed via both the LTE network and the Next Generation Mobile Network, based on whether the UE is dual connectivity capable.

6. The method of claim 1, wherein the Next Generation Mobile Network comprises one of a LTE Advanced (LTE-A) or a Fifth Generation (5G) New Radio (NR) mobile network.

7. The method of claim 1, wherein the LTE network comprises a Fourth Generation (4G) mobile network.

8. A network device, comprising:
a communication interface; and
a processing unit, coupled to the communication interface, and configured to implement a control node to:
receive, via the communication interface, an indication of a session associated with a user equipment (UE), wherein the network device is connected to a LTE network, and the LTE network is interconnected with a Next Generation Mobile Network;
determine one or more parameters associated with at least one of:
a) a relative traffic loading of the LTE network and the Next Generation Mobile Network,
b) a quantity of first cells within the LTE network and a quantity of second cells within the Next Generation Mobile Network,
c) a movement status of the UE,
d) a quantity of data associated with the session, or
e) a latency sensitivity of the session;
determine, based on the one or more parameters, whether the LTE network or the Next Generation Mobile Network can best support the session;
cause the session to be selectively routed to the UE while the session is ongoing via either the LTE network or the Next Generation Mobile Network in response to determining whether the LTE network or the Next Generation Mobile Network can best support the session; and
cause the session to be routed to the UE while the session is ongoing via both the LTE network and the Next Generation Mobile Network in response to determining that the LTE network and the Next Generation Mobile Network can support the session approximately equally or that load sharing between the LTE network and the Next Generation Mobile Network can best support the session.

9. The network device of claim 8, wherein the processing unit is further configured to implement the control node to:
determine service availability of the LTE network and the Next Generation Mobile Network, and
wherein determining whether the LTE network or the Next Generation Mobile Network can best support the session is further based on the determined service availability of the LTE network and the Next Generation Mobile Network.

10. The network device of claim 8, wherein the processing unit is further configured to implement the control node to:
determine a type of mobile service associated with the session,
wherein determining whether the LTE network or the Next Generation Mobile Network can best support the session is further based on the determined type of mobile service associated with the session.

11. The network device of claim 10, wherein, when determining the type of mobile service associated with the session, the processing unit is further configured to implement the control node to:
determine whether the type of mobile service is a voice service or an Internet Protocol Multimedia Subsystem (IMS) service, and
wherein causing the session to be selectively routed via either the LTE network or the Next Generation Mobile Network further comprises:
causing the session to be routed to the LTE network if the type of mobile service is the voice service or the IMS service.

12. The network device of claim 8, wherein the processing unit is further configured to implement the control node to:
determine if the UE is dual connectivity capable such that the UE is capable of wirelessly connecting to the LTE network and to the Next Generation Mobile Network, and
cause the session to be routed via both the LTE network and the Next Generation Mobile Network based on whether the UE is dual connectivity capable.

13. The network device of claim 8, wherein the Next Generation Mobile Network comprises one of a LTE Advanced (LTE-A) or a Fifth Generation (5G) New Radio (NR) mobile network, and wherein the LTE network comprises a Fourth Generation (4G) mobile network.

14. A non-transitory storage medium storing instructions executable by a processing unit associated with a network device, wherein the instructions comprise instructions to cause the processing unit to:
receive an indication of a session associated with a user equipment (UE), wherein the network device is connected to a LTE network, and the LTE network is interconnected with a Next Generation Mobile Network;

determine one or more parameters associated with at least one of:
  a) a relative traffic loading of the LTE network and the Next Generation Mobile Network,
  b) a quantity of first cells within the LTE network and a quantity of second cells within the Next Generation Mobile Network,
  c) a movement status of the UE,
  d) a quantity of data associated with the session, or
  e) a latency sensitivity of the session;

determine, based on the one or more parameters, whether the LTE network or the Next Generation Mobile Network can best support the session;

cause the session to be selectively routed to the UE while the session is ongoing via either the LTE network or the Next Generation Mobile Network in response to determining whether the LTE network or the Next Generation Mobile Network can best support the session; and cause the session to be routed to the UE while the session is ongoing via both the LTE network and the Next Generation Mobile network in response to determining that the LTE network and the Next Generation Mobile Network can support the session approximately equally or that load sharing between the LTE network and the Next Generation Mobile Network can best support the session.

15. The non-transitory storage medium of claim 14, wherein the instructions comprise instructions to cause the processing unit to:
  determine service availability of the LTE network and the Next Generation Mobile network,
  wherein determining whether the LTE network or the Next Generation Mobile Network can best support the session is based on the determined service availability of the LTE network and the Next Generation Mobile Network.

16. The non-transitory storage medium of claim 14, wherein the instructions comprise instructions to cause the processing unit to:
  determine a type of mobile service associated with the session,
  wherein determining whether the LTE network or the Next Generation Mobile Network can best support the session is based on the determined type of mobile service associated with the session.

17. The non-transitory storage medium of claim 16, wherein, when determining the type of mobile service associated with the session, the instructions comprise instructions to cause the processing unit to:
  determine whether the type of mobile service is a voice service or an Internet Protocol Multimedia Subsystem (IMS) service, and
  wherein causing the session to be selectively routed via either the LTE network or the Next Generation Mobile Network further comprises:
  causing the session to be routed to the LTE network if the type of mobile service is the voice service or the IMS service.

18. The non-transitory storage medium of claim 14, wherein the instructions comprise instructions to cause the processing unit to:
  determine if the UE is dual connectivity capable such that the UE is capable of wirelessly connecting to the LTE network and to the Next Generation Mobile Network, and
  cause the session to be routed via both the LTE network and the Next Generation Mobile Network based on whether the UE is dual connectivity capable.

19. The non-transitory storage medium of claim 14, wherein the Next Generation Mobile Network comprises one of a LTE Advanced (LTE-A) or a Fifth Generation (5G) New Radio (NR) mobile network.

20. The non-transitory storage medium of claim 14, wherein the LTE network comprises a Fourth Generation (4G) mobile network.

* * * * *